Patented Aug. 30, 1927.

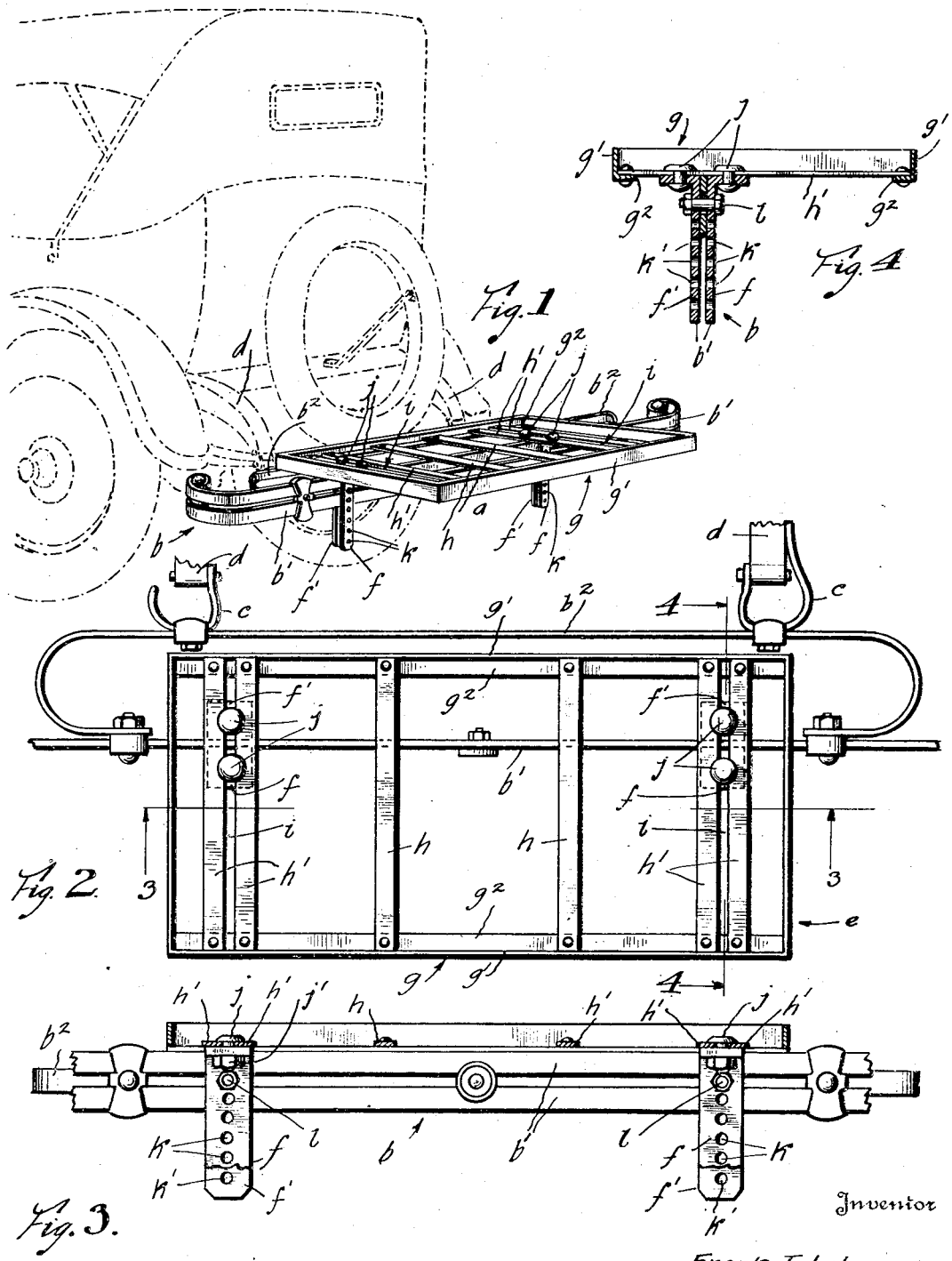

1,640,779

UNITED STATES PATENT OFFICE.

FRANK J. LAHER, OF PORTLAND, OREGON.

LUGGAGE CARRIER FOR AUTOMOBILES.

Application filed February 26, 1925. Serial No. 11,763.

The main object of my invention is to provide a luggage carrier for an automobile, which is adapted to be quickly and easily attached to any standard flat automobile bumper, and also adapted to form with the latter a rigid structure capable of supporting any reasonable load without requiring an auxiliary support.

A further object of my invention is to provide a rack-like attachment of this character and, in connection therewith, brackets which support the rack between its front and rear ends, so as to project beyond both sides of the bumper. This construction permits the weight of the luggage rack, and the load carried thereby, to be more evenly balanced over the bumper than if the bumper was extended entirely to one side thereof.

A further object of my invention is to provide a luggage carrier that is so constructed that it may be fastened to the bumper bar in such a manner that the resiliency thereof will be unaffected.

I carry the broad idea of my invention into practice in a luggage carrier attachment for automobiles comprising a rack, and means located between the front and rear ends of the said rack adapted for fastening the latter to a bar extending crosswise of, and spaced from the one end of the vehicle, said means being movable relatively to said bar, thereby to vary the distance which said rack projects beyond said bar.

Other details of construction and the mode of operation are hereinafter described in greater detail with reference to the accompanying drawings.

In the drawings:

Fig. 1 is a fragmentary prospective view of the rear end of an automobile and the bumper thereon carrying my improved luggage carrier, the automobile proper being shown in dotted outline;

Fig. 2 is a plan view of my luggage carrier clamped to the bumper bar;

Fig. 3 is a section taken on the line 3—3 of Fig. 2, and shows the clamping devices or brackets which fasten the rack to the bumper bar; and Fig. 4 is a section taken on the line 4—4 of Fig. 2.

My luggage carrier $a$ is adapted to be fastened to any standard flat automobile bumper $b$ and is especially arranged to be carried on the rear bumper, as shown in Fig. 1. Said bumper $b$ is shown as comprising the bumper bar $b'$ and the resilient mounting member $b^2$. Said member is carried by brackets $c$, which are fastened in turn to the frame members $d$ of the automobile.

Said luggage carrier rack comprises a frame or body $e$ and bracket members $f$ and $f'$. The frame is preferably rectangular and has a border portion $g$ which is perfectly angular in section, as shown in Fig. 4; one web $g'$ thereof is upstanding and constitutes a vertical flange encompassing the remainder of the frame. The other web $g^2$ extends inwardly and constitutes a ledge upon which the slats $h$ are fastened. Two pairs of slats $h'$ are spaced relatively close together so as to provide slots and guideways $i$ between them in which the brackets $f$ and $f'$ are carried.

Said members $h'$ are arranged at opposite ends of said frame and one bracket $f$ and one bracket $f'$ constitutes a single clamping device. Each bracket is fastened to the body by bolts $j$, the heads of which are larger in diameter than the width of the slot $i$, and nuts $j'$ are adapted to be tightened to fix each bracket to the frame.

Each bracket $f$ and $f'$ is thus independent of the other and thus said brackets can be spaced closer together or farther apart to accommodate bumper bars, which vary in thickness. Said brackets also can be spaced along said slot $i$ so as to permit the frame to be adjusted relatively to the bumper bar and to accommodate the varying spaces between the bumper bar and its mounting, and with other devices such as a spare tire, carried at the rear of the automobile.

The brackets $f$ and $f'$ are L-shaped and one flange thereof is fastened against the under side of the slats $h'$. The other flange constitutes a pendent leg. Said legs are provided with a plurality of holes $k$ and $k'$ in the brackets $f$ and $f'$, respectively, so as to permit said legs to straddle and be fixed to any bumper bar of any reasonable width. This permits my luggage carrier to be fixed to any of the standard flat-bar-type bumpers which are sold in the market at the present time, even though their bumper bars are made of one or two members or whether said members are parallel or not, relatively to each other.

A bolt $l$ passes through any of the holes $k$ and $k'$ that register with each other and thus hold the brackets tightly against the sides of the bumper.

I claim:

1. A luggage carrier attachment, of the character described, for vehicles comprising a rack provided at its lateral sides with spaced contiguous members extending parallel with said lateral sides and supporting brackets inserted between said members.

2. A luggage carrier attachment, of the character described, for vehicles comprising a rack provided at its lateral sides with spaced contiguous bars extending parallel with said lateral sides, supporting brackets inserted between said bars said supporting brackets consisting of companion L-shaped pieces, the upper ends of which are formed to bear against said bars and their lower ends being pendent, and said ends being provided with holes to receive bolts.

FRANK J. LAHER.